United States Patent
Hara

(10) Patent No.: US 7,922,152 B2
(45) Date of Patent: Apr. 12, 2011

(54) VALVE ELEMENT OPENING/CLOSING DEVICE

(75) Inventor: Tetsuhiko Hara, Nagano (JP)

(73) Assignee: Nidec Sankyo Corporation (JP)

( * ) Notice: Subject to any disclaimer, the term of this patent is extended or adjusted under 35 U.S.C. 154(b) by 434 days.

(21) Appl. No.: 12/101,200

(22) Filed: Apr. 11, 2008

(65) Prior Publication Data

US 2008/0251147 A1    Oct. 16, 2008

(30) Foreign Application Priority Data

Apr. 12, 2007   (JP) .................................. 2007-104621

(51) Int. Cl.
*F16K 31/44* (2006.01)
(52) U.S. Cl. .................... 251/263; 251/253; 251/129.11; 137/607
(58) Field of Classification Search ............. 251/129.11, 251/129.12, 129.13, 251, 252, 253, 262, 251/263; 137/605, 606, 607
See application file for complete search history.

(56) References Cited

U.S. PATENT DOCUMENTS

| | | | | |
|---|---|---|---|---|
| 4,357,957 A * | 11/1982 | Bisonaya et al. | .......... | 137/636.1 |
| 4,436,280 A * | 3/1984 | Geisow | .......... | 251/229 |
| 5,067,359 A * | 11/1991 | Flaig et al. | .......... | 74/107 |
| 6,007,047 A * | 12/1999 | Phipps | .......... | 251/252 |
| 6,534,793 B1 * | 3/2003 | Heritier-Best | .......... | 257/77 |
| 6,769,665 B2 * | 8/2004 | Silva et al. | .......... | 251/71 |
| 6,918,408 B2 * | 7/2005 | Hara | .......... | 137/597 |
| 7,284,571 B2 * | 10/2007 | Ozawa et al. | .......... | 137/625.46 |
| 7,475,704 B2 * | 1/2009 | Hara et al. | .......... | 137/625.11 |

FOREIGN PATENT DOCUMENTS

| | | |
|---|---|---|
| JP | 2001-241825 | 9/2001 |
| JP | 2002-349740 | 12/2002 |

* cited by examiner

*Primary Examiner* — John K Fristoe, Jr.
(74) *Attorney, Agent, or Firm* — Cantor Colburn LLP

(57) ABSTRACT

A valve element opening/closing device may include a main body formed with a space, an inflow pipe and an outflow pipe which are connected to the main body, a valve element for opening and closing a flow passage, and a drive part for driving the valve element to open and close the flow passage. The valve element may be arranged on an inflow pipe side with respect an opening of the main body to which the inflow pipe is connected. The valve element is preferably arranged within the inflow pipe.

7 Claims, 10 Drawing Sheets

[Fig. 1]
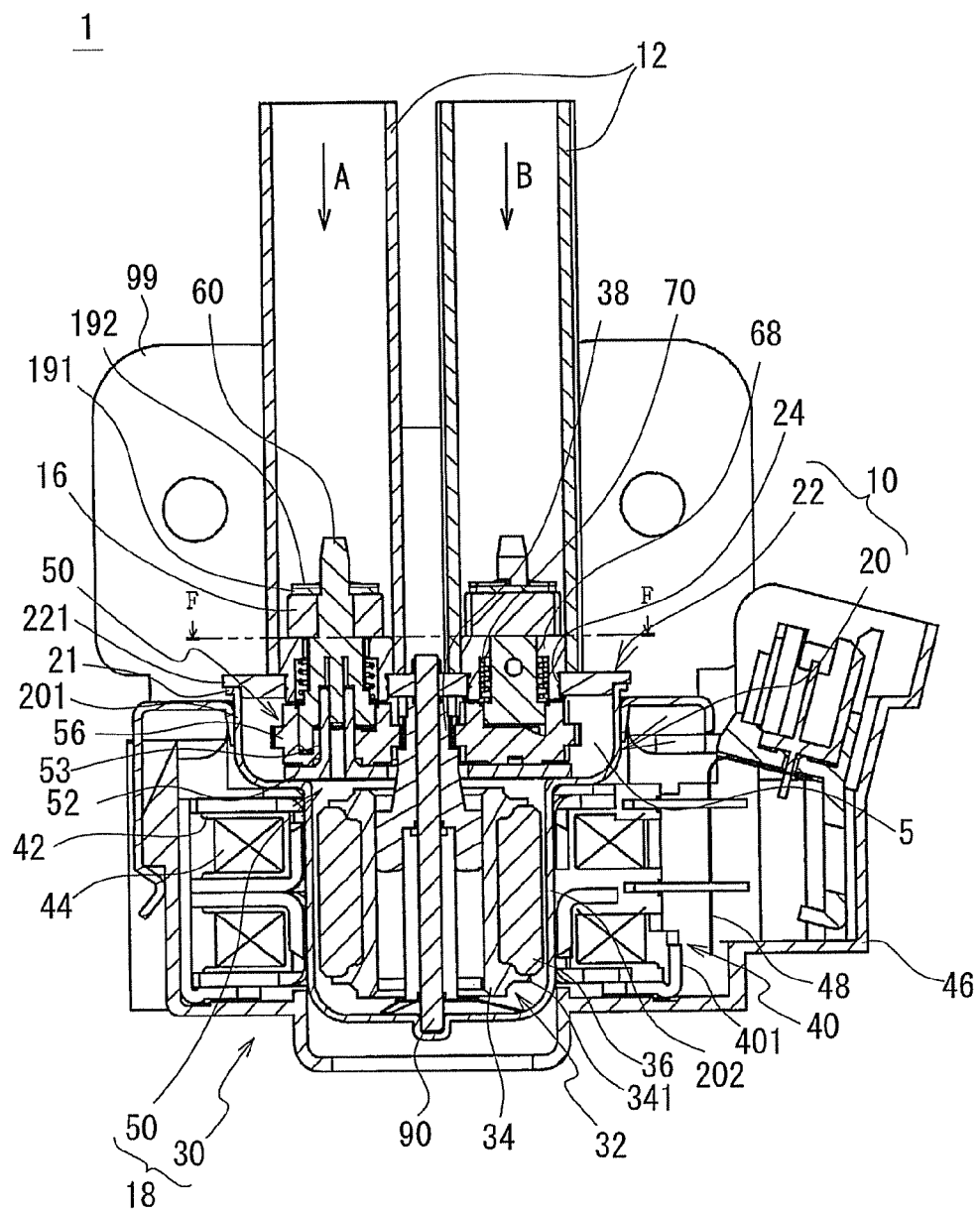

[Fig. 2]
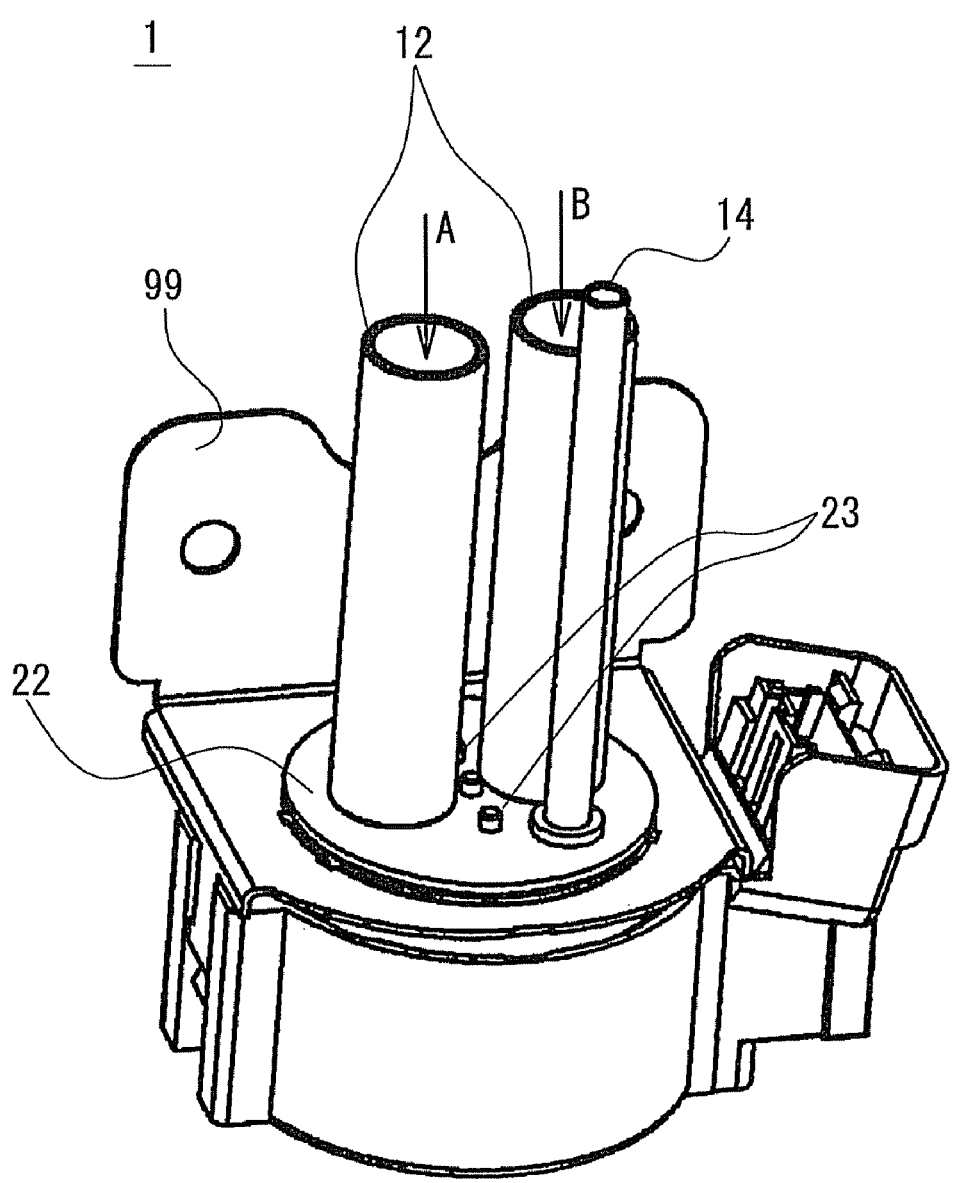

[Fig. 3]
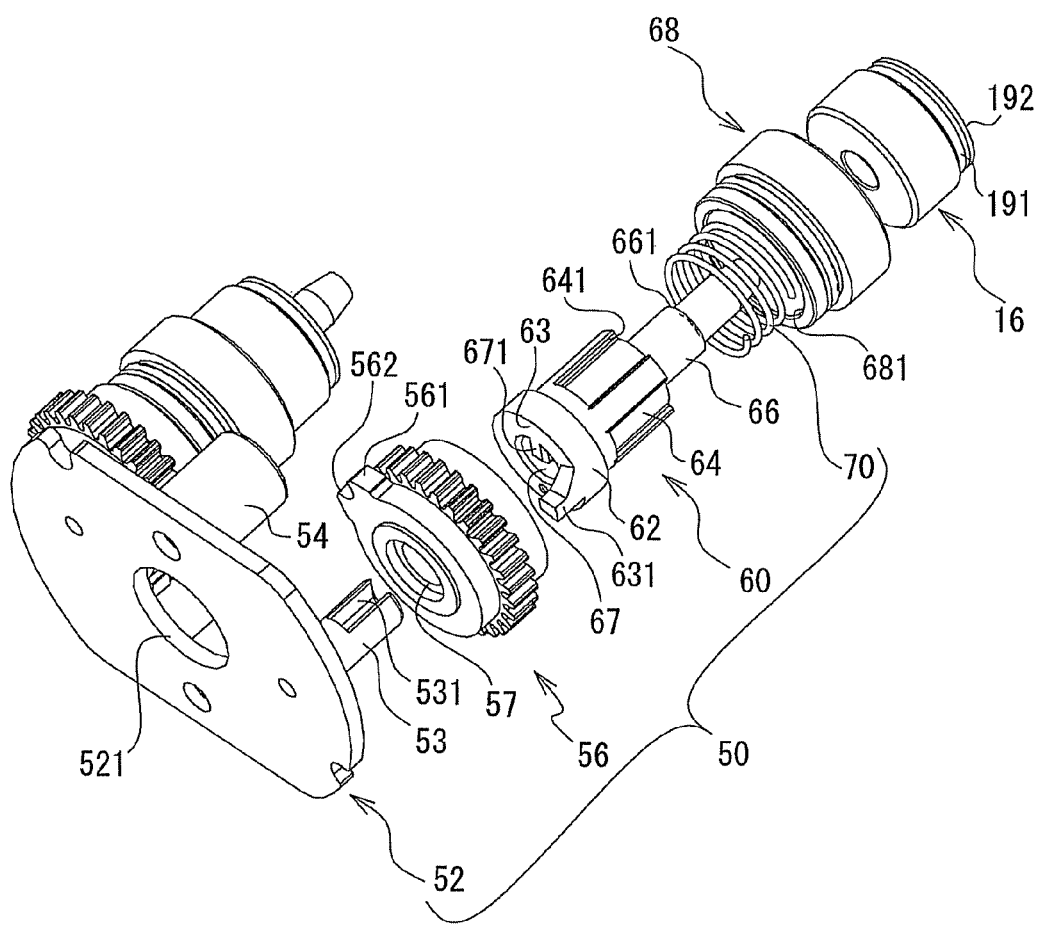

[Fig. 4]
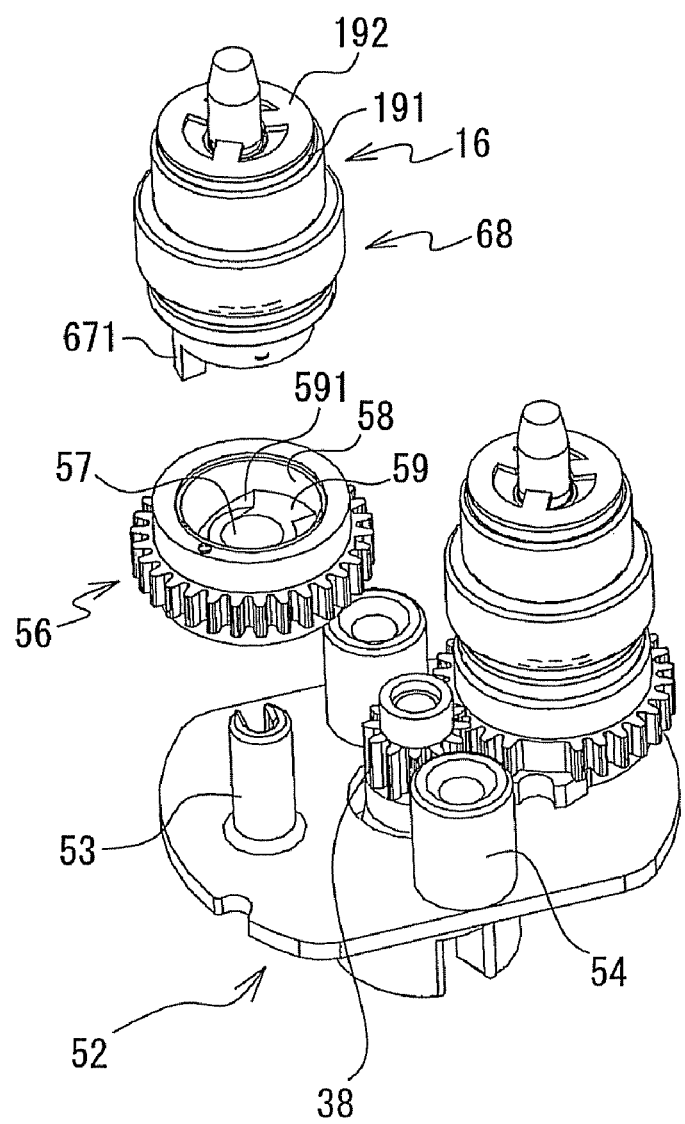

[Fig. 5]
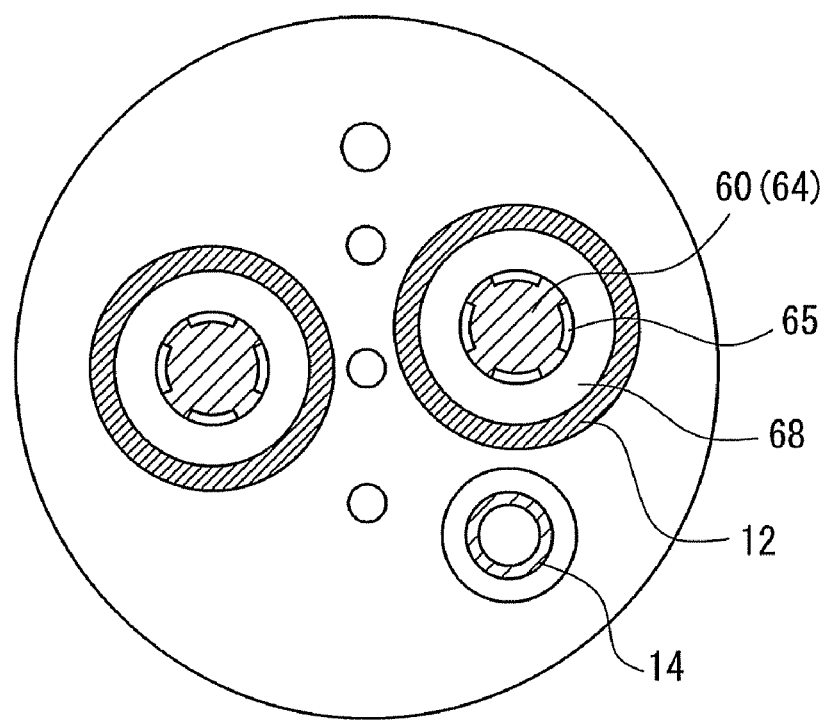

[Fig. 6]
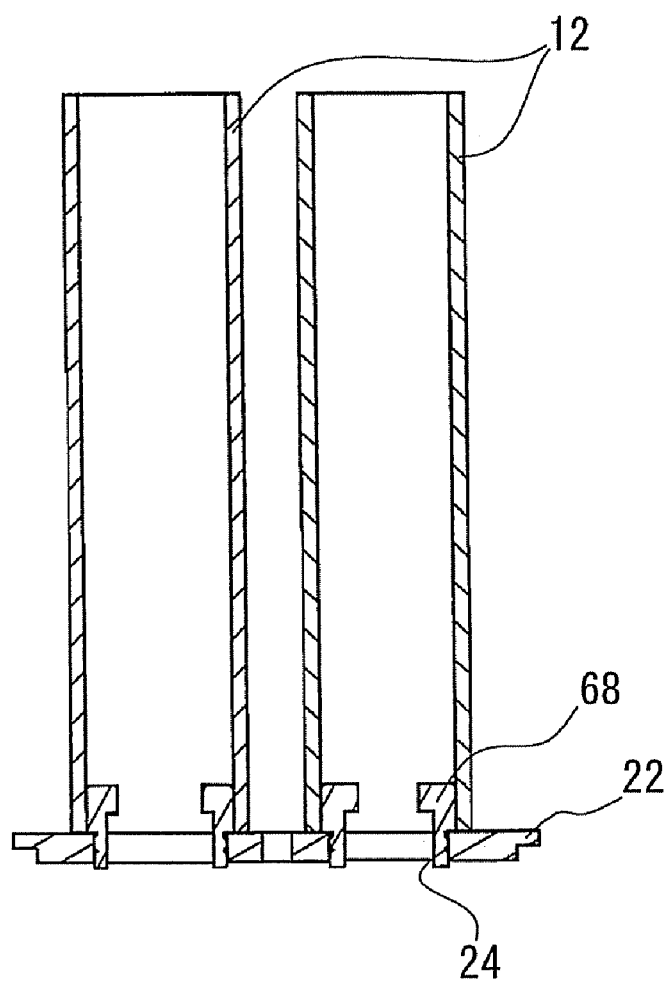

[Fig. 7]
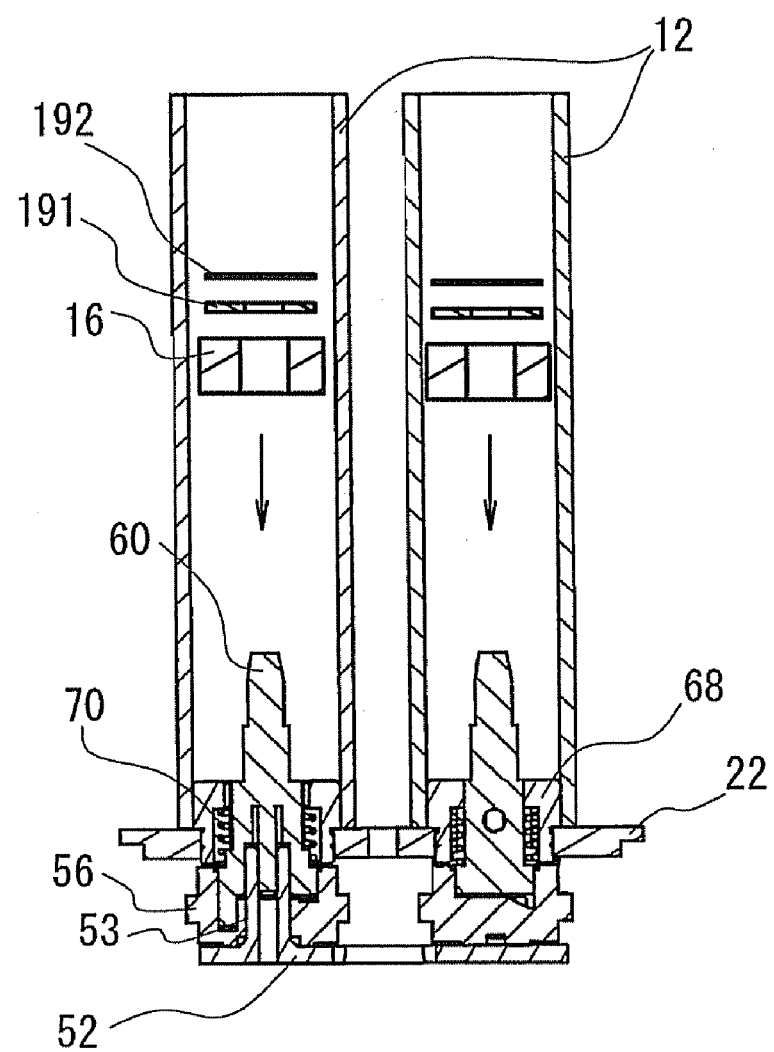

[Fig. 8]
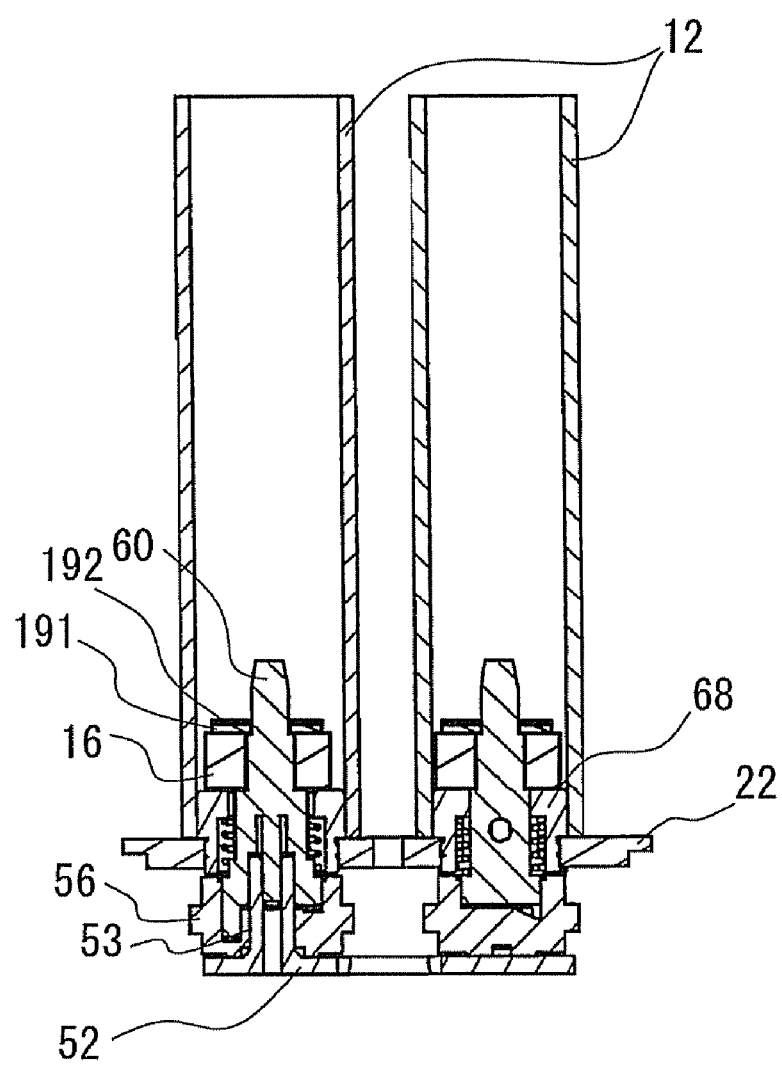

[Fig. 9]
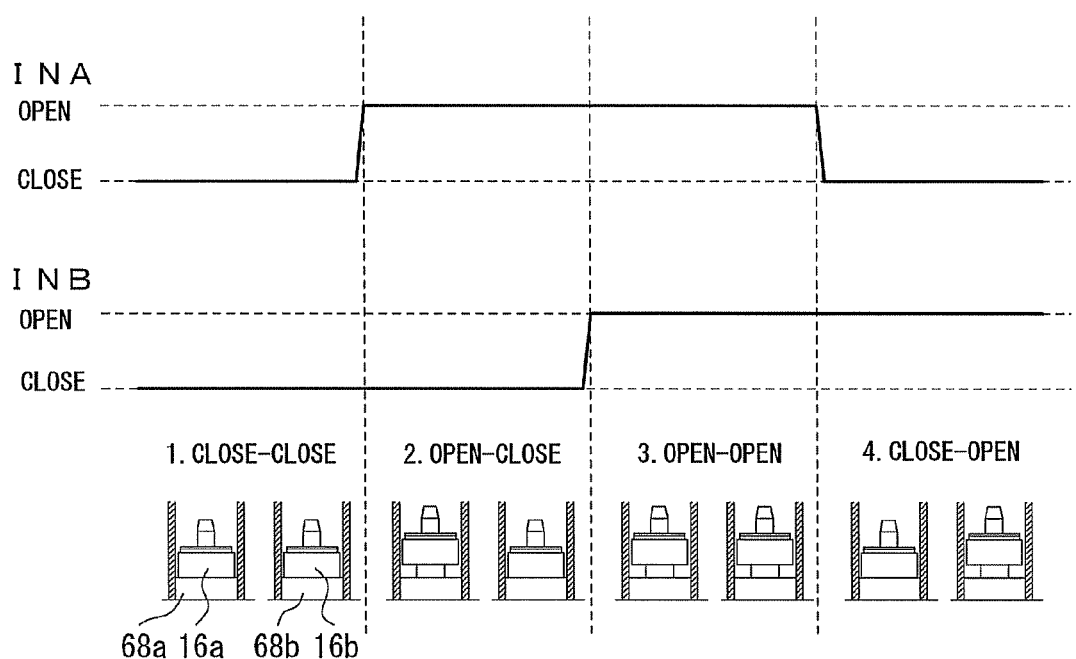

[Fig. 10]
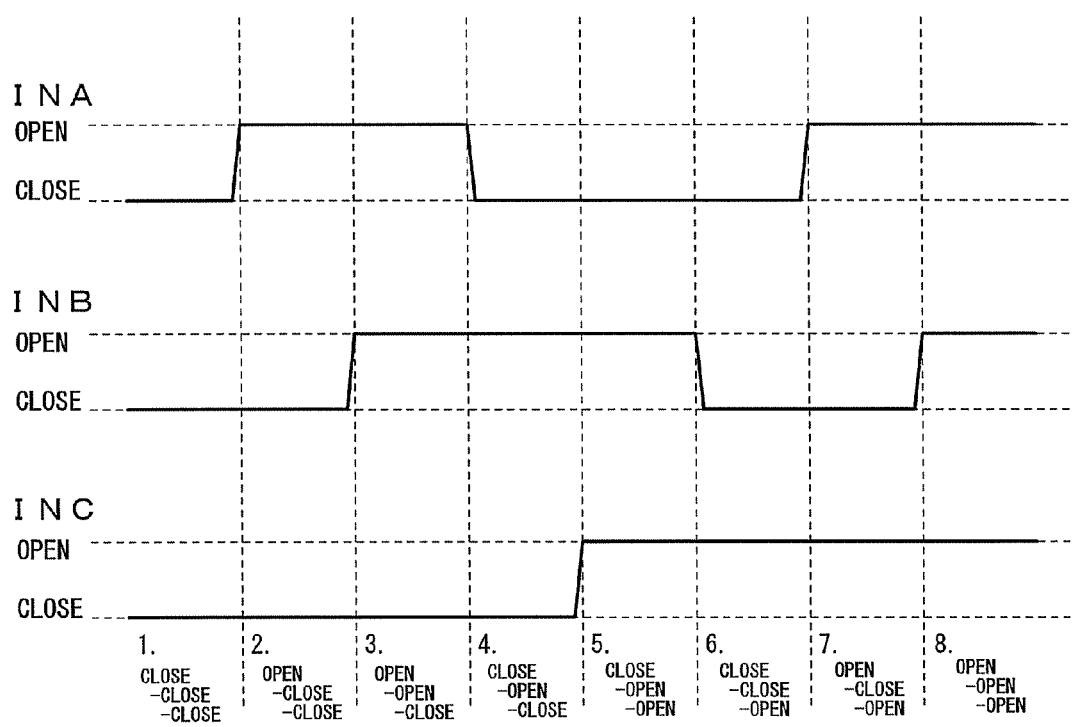

VALVE ELEMENT OPENING/CLOSING DEVICE

CROSS REFERENCE TO RELATED APPLICATION

The present invention claims priority under 35 U.S.C. §119 to Japanese Application No. 2007-104621 filed Apr. 12, 2007, which is incorporated herein by reference.

FIELD OF THE INVENTION

An embodiment of the present invention may relate to a valve element opening/closing device. More specifically, an embodiment of the present invention may relate to a valve element opening/closing device in which a valve element is operated by a motor to open and close a flow passage.

BACKGROUND OF THE INVENTION

Valve element opening/closing devices have been conventionally known in which a valve element is driven by a motor as a drive source to open and close a flow passage for refrigerant in a refrigerator or the like. In Japanese Patent Laid-Open No. 2002-349740, a valve element opening/closing device is disclosed in which a valve element is mounted on a screw member and the valve element is advanced or retreated in its axial direction by means of that the screw member is rotated by a motor to cause a flow passage into which refrigerant flows to open and close. In the valve element opening/closing device, a mechanical structure such as the number of input/output ports and its control method are determined depending on its application and disposed location.

For example, in Japanese Patent Laid-Open No. 2001-241825, a structure of a refrigerator-freezer is disclosed in which a defrosting valve is disposed at an upstream side position of an evaporator for freezing compartment for controlling temperature and defrosting in the freezing compartment (see FIG. 10 etc.). The defrosting valve is a valve in which one of three kinds of refrigerants with different temperatures to be inputted is selected and controlled to flow into the evaporator for freezing compartment and which is provided with a plurality of input ports (three input ports and one output port).

However, in the valve element opening/closing device shown in the former Patent Reference, when a flow passage for fluid is to be closed, the valve element is required to operate against a pressure of fluid which flows into the device. Therefore, in order to securely close the flow passage, a measure may be required, for example, a newly reduction gear is required to be added or a torque of the motor is required to increase. As a result, a size and a manufacturing cost of the valve element opening/closing device are increased.

Further, as described in the latter Patent Reference, in the valve element opening/closing device in which a plurality of inputted fluids is selectively controlled to flow out, a total sum of fluid pressures inputted into the device may be larger. Therefore, a force for closing the flow passage for fluid is required to farther increase and thus the size of the valve element opening/closing device and its manufacturing cost are further increased.

SUMMARY OF THE INVENTION

In view of the problems described above, an embodiment of the present invention may advantageously provide a valve element opening/closing device in which a flow passage for fluid can be securely closed with a simple structure even when the number of input ports in the valve element opening/closing device is increased and a total sum of fluid pressures applied to the device becomes larger.

Thus, according to an embodiment of the present invention, there may be provided a valve element opening/closing device including a main body which is formed with a space in an inside of the main body, an inflow pipe which is connected to the main body for flowing fluid into the space, an outflow pipe which is connected to the main body for flowing the fluid out from the space, a valve element for opening and closing a flow passage through which the fluid flows from the inflow pipe to the outflow pipe through the main body, and a drive part for driving the valve element to open and close the flow passage. In the valve element opening/closing device, the valve element, which is moved by the drive part to be in an open state or in a closed state, is arranged on an inflow pipe side with respect an opening of the main body to which the inflow pipe is connected.

Specifically, the valve element opening/closing device may include a base plate which structures the main body and which is formed with an opening connected with the inflow pipe, and a valve seat which is fixed on the inflow pipe side of the opening formed in the base plate and with which the valve element is tightly contacted to close the flow passage. In addition, the valve element is disposed on the inflow pipe side of the valve seat and within the inflow pipe.

According to the valve element opening/closing device in accordance with the embodiment of the present invention, the valve element which opens and closes a flow passage for fluid is disposed on an outer side of the main body, i.e., on the inflow pipe side with respect to the opening through which the fluid flows, in the valve element opening/closing device. Therefore, the valve element is urged in the closing direction by the fluid pressure of the inputted fluid. Accordingly, when the opening is to be in the closed state, a force against the fluid pressure is not required and thus the flow passage can be securely closed. Further, the valve element is operated in the axial direction to attain the open state or the close state of the opening and thus the valve element can be accommodated within the inflow pipe connected to the opening and the size of the valve element opening/closing device can be reduced.

In accordance with an embodiment of the present invention, the inflow pipe comprises a plurality of inflow pipes and the valve element is arranged in each of the inflow pipes. As described above, when a plurality of inflow pipes are provided and the valve element is disposed in each of the inflow pipes, the valve element opening/closing device is capable of selectively controlling fluid to be outputted from a plurality of kinds of fluid inputted into the device (for example, a plurality of fluids with different temperatures).

In accordance with an embodiment of the present invention, the valve element opening/closing device is provided with a mode in which all of flow passages corresponding to the plurality of the inflow pipes are set to be in a closed state by using each of the plurality of the valve elements, and a mode in which only one of the flow passages is set to be in an open state. As described above, when the valve element opening/closing device is provided with a mode in which all of flow passages corresponding to the plurality of the inflow pipes are set to be in a closed state, and a mode in which only one of the flow passages is set to be in an open state, the valve element opening/closing device is obtained in which fluid to be outputted can be selectively controlled from a plurality of kinds of fluid inputted into the device (for example, a plurality of fluids with different temperatures).

In accordance with an embodiment of the present invention, the valve element opening/closing device is provided with a mode in which all of the flow passages are set to be in an open state by using each of the plurality of the valve elements. As described above, when the valve element opening/closing device is provided with a mode in which all of the flow passages are set to be in an open state, all the valve elements can be set at positions separated from the respective openings. Therefore, when the valve element opening/closing device is assembled into a refrigerator or the like, the valve elements can be prevented from being damaged by welding heat by means of that all the valve elements are set to be separated from the openings.

Further, in accordance with an embodiment of the present invention, the drive part includes a motor which is a drive source, and a linearly moving mechanism part which drives the valve element so as to close or open the opening by rotation of the motor. The linearly moving mechanism part includes a linearly moving member which is connected with the valve element, a cam which is turned by the motor for moving the valve element in a separated direction from the opening through the linearly moving member, and an urging member for urging the valve element in a closing direction of the valve element.

According to the structure as described above, the valve element is always urged in a direction where the opening is closed by the urging member. Therefore, only when the valve element is to be moved in the direction where the opening is opened, a drive force of the motor that is a drive source is used through the linearly moving mechanism part. Accordingly, electric power consumption in the valve element opening/closing device can be restrained.

In this case, the linearly moving mechanism part may include a transmitting gear which is turned by the motor, and a slider for moving the valve element in an open direction by a gear side cam face which is formed on a valve element side of the transmitting gear. The transmitting gear is disposed on a main body side with respect to the valve seat, and the valve element is mounted on the slider which is penetrated through the valve seat, and the transmitting gear, the slider, the valve seat and the valve element are coaxially disposed. According to the structure as described above, the valve element and the linearly moving mechanism part for moving the valve element can be disposed compact.

In accordance with an embodiment of the present invention, the valve element opening/closing device includes a turning prevention mechanism which is provided in the linearly moving mechanism part for restricting turning of the valve element, a rotary power transmission member for transmitting a drive force of the motor to the linearly moving member, and a shaft by which the rotary power transmission member is turnably supported. The turning prevention mechanism includes a protruded part which is provided in the linearly moving member, and a recessed part which is formed in the shaft and engaged with the protruded part which is provided in the linearly moving member. As described above, the turning prevention mechanism is provided between the linearly moving member of the linearly moving mechanism part and the shaft on which the rotary power transmission member for transmitting a drive force of the motor to the linearly moving member is turnably supported. Therefore, other separate member as the turning prevention member for the valve element is not required and thus the structure of the valve element opening/closing device can be made compact.

In this case, the turning prevention mechanism of the linearly moving mechanism part may be structured of a protruded part which is provided in the slider, and a recessed part which is formed in the shaft and engaged with the protruded part which is provided in the slider.

In accordance with an embodiment of the present invention, a turning restriction part is provided in the rotary power transmission member for restricting a turning amount of the rotary power transmission member to less than one rotation. As described above, when the turning restriction part is provided in the rotary power transmission member for restricting its turning amount to less than one rotation, a new separate member is not required as a turning restriction member for the rotary power transmission member such as a gear and thus the structure of the valve element opening/closing device can be made compact. Specifically, the turning restriction part may be provided in the transmitting gear for restricting its turning amount to less than one rotation.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a cross-sectional view showing a valve element opening/closing device in accordance with a first embodiment of the present invention.

FIG. 2 is a perspective outward appearance view showing the valve element opening/closing device shown in FIG. 1.

FIG. 3 is an exploded perspective view showing a structure of a linearly moving mechanism part in the valve element opening/closing device shown in FIG. 1.

FIG. 4 is another exploded perspective view showing the structure of the linearly moving mechanism part in the valve element opening/closing device shown in FIG. 1.

FIG. 5 is an "F-F" cross-sectional view showing the valve element opening/closing device shown in FIG. 1.

FIG. 6 is a cross-sectional view for explaining an assembling method for the valve element opening/closing device shown in FIG. 1 and showing a state in which valve seats and inflow pipes are fixed to a base plate.

FIG. 7 is a cross-sectional view for explaining an assembling method for the valve element opening/closing device shown in FIG. 1 and showing a state in which a valve element is to be assembled from a tip end side of the inflow pipe.

FIG. 8 is a cross-sectional view for explaining an assembling method for the valve element opening/closing device shown in FIG. 1 and showing a state in which the valve element has been fitted to a slider.

FIG. 9 is a time chart for explaining an opening/closing operation of the valve element opening/closing device shown in FIG. 1.

FIG. 10 is a time chart for explaining an opening/closing operation of a valve element opening/closing device in accordance with a second embodiment of the present invention.

DETAILED DESCRIPTION OF THE PREFERRED EMBODIMENTS

An embodiment of the present invention will be described in detail below with reference to the accompanying drawings. FIG. 1 is a cross-sectional view showing a valve element opening/closing device 1 in accordance with a first embodiment of the present invention and FIG. 2 is its perspective outward appearance view.

The valve element opening/closing device 1 is a so-called "2-IN/1-OUT" valve which is capable of selectively outputting, e.g. passing either one of two kinds of fluids, e.g., two kinds of fluids whose temperatures are different from each other, which are inputted or flown into the device. In this embodiment, structural components for controlling fluid "A" inputted into the device have the same structure as those for controlling fluid "B". Therefore, when it is required to be distinguished from each other, the notational symbol "a" is added to the structural components for controlling the fluid "A" and the notational symbol "b" is added to the structural components for controlling the fluid.

The valve element opening/closing device 1 includes a main body 10 having a space or a fluid cavity 5 in its inside, inflow pipes 12 which are connected to the main body 10 and are flow passages for fluid flowing into the fluid cavity 5, an outflow pipe 14 which is a flow passage for the fluid flowing out from the fluid cavity 5, valve elements 16, each of which is arranged within the inflow pipe 12 and tightly contacted with and separated from a valve seat 68 to open and close the flow passage for fluid flowing into the fluid cavity 5, and a drive part 18 for driving the valve element 16 to open and close the flow passage. Since the valve element 16 is arranged within the inflow pipe 12, an outer diameter of the valve element 16 is set to be smaller than an inner diameter of the inflow pipe 12. Respective structures will be described below.

The main body 10 is a case body within which the space or the fluid cavity 5 is formed and is structured of a main body case 20 and a base plate 22. The main body case 20 is formed by a press-drawing work with stainless steel material so as to be provided with a large cylindrical part 201 having a relatively large diameter and a small cylindrical part 202 having a relatively small diameter.

The base plate 22 is a plate member made of stainless steel. In this embodiment, the base plate 22 is formed with inflow openings or inflow ports 24 for flowing fluid into the fluid cavity 5 and an outflow opening or an outflow port (not shown) for flowing the fluid out from the fluid cavity 5. Further, positioning pins 23 are stood up at two positions for positioning and fixing a plate 52 described below to the base plate 22.

A flange part 21 is formed at an opening edge part of the large cylindrical part 201 of the main body case 20, and a periphery of the base plate 22 is formed with a step portion 221. The flange part 21 and the step portion 221 are fixed to each other by TIG (tungsten inert gas) welding to structure the main body 10.

The inflow pipe 12 and the outflow pipe 14 are pipes made of copper. The inflow pipes 12 and the outflow pipe 14 are respectively connected and fixed by brazing to the inflow ports 24 and the outflow port (not shown) which are formed in the base plate 22. In this manner, flow passages for fluid flowing into the fluid cavity 5 of the main body 10 are formed and a flow passage for the fluid flowing out from the fluid cavity 5 is formed.

A valve element 16 is an elastic member which is made of rubber and formed in a cylindrical shape. The valve element 16 is fixed to a step portion 661 formed in an end part 66 of a slider 60 described below by a spring nut 192 through a washer 191. The valve element 16 is tightly contacted with and separated from the valve seat 68 by a driving force of a motor 30 to open and close a flow passage for fluid flowing into the valve element opening/closing device 1.

A driving part 18 includes the motor 30 which is a drive source and a linearly moving mechanism part 50 for transmitting a drive force of the motor 30 to the valve element 16.

The motor 30 is a well-known stepping motor which includes a rotor 32 and a stator part 40. The rotor 32 is rotatably supported by a support shaft 90 that is supported by the main body case 20 and a center portion of the base plate 22. The rotor 32 is provided with a cylindrical shaft part 34 to which a support shaft 90 is inserted so that the cylindrical shaft part 34 is capable of being rotated, and a circular ring shaped magnet (permanent magnet) 36 is integrally fitted to the cylindrical shaft part 34 in a supported state by holding parts 341 which are formed on outer peripheral edges on both sides of the cylindrical shaft part 34. Further, an output gear 38 for outputting a rotary power of the motor 30 through a coupling mechanism (not shown) is formed on the base plate 22 side of the rotor 32 so as to rotate with the rotor 32 in an integral manner. The output gear 38 is inserted through a through-hole 521 of the plate 52 and located on the inner side of the large cylindrical part 201.

A stator part 40 comprised of two layer stators 401 is formed on an outer peripheral face of the small cylindrical part 202 of the main body case 20 so as to face the rotor 32. A drive coil 44 is wound around a coil bobbin 42 to structure each of the stators 401. The stator part 40 is fixed to a stator case 46 so that its outer peripheral face is surrounded by the stator case 46 and fitted to the outer side of the main body case 20.

In each of the drive coils 44 of the stators 401, respective tip end parts of terminals for the drive coils 44 are connected to predetermined positions of a control circuit board 48. Rotation of the rotor 32 is controlled by controlling energization to the drive coils 44 through the control circuit board 48.

The linearly moving mechanism part 50 includes the plate 52, a transmitting gear 56, the slider 60 and a spring 70. Exploded views for explaining a structure of the linearly moving mechanism part 50 are shown in FIGS. 3 and 4.

The plate 52 is a plate-shaped member which is integrally formed by using poly-nano-methylene terephthalamide (PA9T:polyamide 9T) and is a member which is mounted to the base plate 22. The through hole 521 through which the output gear 38 of the rotor 32 is passed is formed at a roughly center portion of the plate 52. Further, two shafts 53 and two positioning bosses 54 are formed around the through hole 521 so as to interpose the through hole 521. The shaft 53 is formed so as to correspond and face the inflow port 24 that is formed in the base plate 22 and to which the inflow pipe 12 is connected and fixed. The shaft 53 is a shaft member by which the transmitting gear 56 and the slider 60 are supported so that an end part of the slider 60 can be inserted into the inflow pipe 12. A recessed part 531 which is a part of a turning prevention mechanism for the slider 60 is formed in an outer peripheral face of the shaft 53 so as to extend in its longitudinal direction. The positioning pin 23 stood on the base plate 22 is engaged with the positioning boss 54, whereby the plate 52 is positioned and fixed at a prescribed position.

The transmitting gear 56 is a gear which is, similarly to the plate 52, integrally formed by using poly-nano-methylene terephthalamide (PA9T), and which is engaged with the output gear 38 of the rotor 30. The transmitting gear 56 is formed on its axis of rotation with a shaft hole 57 into which the shaft 53 is inserted so that the transmitting gear 56 is turnably supported. Further, a bottomed engaging hole 58 whose diameter is larger than that of the shaft hole 57 is formed on a slider side face of the transmitting gear 56 in an coaxial manner with the shaft hole 57. A bottom face of the engaging hole 58 is formed with a recessed cam face 59 as a gear side cam face which is formed with a cam groove 591 formed in a predetermined width along a wall face of the engaging hole 58. The cam groove 591 is formed so that its groove is deepened along a turning direction of the transmitting gear 56. In accordance with an embodiment, the recessed cam face 59 may be formed as a protruded cam face which protrudes from a flat face on the slider side of the transmitting gear 56.

A turning restriction part 561 is formed on an outer peripheral face at the lower portion of the transmitting gear 56. The turning restriction part 561 is a protruded member for setting a home position of the transmitting gear 56 and for preventing the transmitting gear 56 from turning more than one rotation. The turning restriction part 561 is formed so as to protrude from the outer peripheral face of the transmitting gear 56. Further, a circular recessed part 562 is formed in the turning restriction part 561. The recessed part 562 is used so that a positional relationship between the transmitting gear 56a for fluid "A" and the transmitting gear 56b for fluid "B" is set to be in a predetermined relationship in the turning direction. Specifically, for example, two positioning pins are stood on a jig plate and the positioning pins are respectively engaged with the recessed parts 562 so that the transmitting gears 56a and 56b are positioned in a predetermined positional relationship.

The slider 60 is, similarly to the plate 52 and the transmitting gear 56, integrally formed by using poly-nano-methylene terephthalamide (PA9T) and is a shaft member including a base part 62, a main body part 64, and an end part 66.

The base part 62 is a part which is engaged with the engaging hole 58 of the transmitting gear 56. The bottom face of the base part 62 is formed with a protruded cam face 63 as a slider side cam face on which a projection 631 for engaging with the cam groove 591 is formed.

The main body part 64 is a part which is passed through the spring 70 and the valve seat 68. An outer diameter of the main body part 64 is smaller than an outer diameter of the valve seat 68, in other words, the outer diameter of the main body part 64 is set to be smaller than an inner diameter of the inflow pipe 12. An outer peripheral face of the main body part 64 is formed in a longitudinal direction with grooves 641 having a predetermined width at intervals of 90 degrees in its turning direction. FIG. 5 is an "F-F" cross-sectional view in FIG. 1 and is a cross-sectional view showing an abutting face of the valve seat 68 with the valve element 16. As shown in FIG. 5, when the main body part 64 is inserted into the shaft hole 681 of the valve seat 68, openings 65 are formed between the shaft hole 681 of the valve seat 68 and the main body part 64 of the slider 60 through the grooves 641. When the valve element 16 is in an open state, fluid to be inputted into the valve element opening/closing device 1 flows into the fluid cavity 5 through the openings 65.

The end part 66 is a part to which the valve element 16 is fitted and fixed and, as described above, the valve element 16 is placed and fixed to the stepped part 661.

Further, a shaft hole 67 into which the shaft 53 is inserted is formed in the slider 60. A protruded engaging part 671 is formed in the shaft hole 67 so as to protrude to an inner side in the radial direction of the shaft hole 67. The protruded engaging part 671 engages with a recessed engaging part 531 formed in the shaft 53 which is stood on the plate 52 to structure a turning prevention mechanism for the slider 60 (valve element 16). The turning prevention mechanism is not limited to this structure. In other words, a mechanism may be used in which turning of the slider 60 (valve element 16) is prevented by engagement of the shaft 53 and the shaft hole 67. For example, a so-called "D-cut" structure in which cross sections of the shaft 53 and the shaft hole 67 are formed in a "D"-shape may be adopted, or a so-called serration structure in which their cross sections are formed in a saw-tooth shape may be adopted. In this manner, a separate member for preventing turning of the slider 60 (valve element 16) is not required and a structure of the linearly moving mechanism part 50 can be made compact.

Further, the slider 60 is inserted and supported by the shaft 53 so as to be movable in the axial direction of the shaft 53 and, as described above, the slider 60 is engaged with the engaging hole 58 of the transmitting gear 56. Therefore, movement of the slider 60 in a perpendicular direction (radial direction) with respect to its axial line is restricted. Accordingly, slanting or inclination of the slider 60, i.e., slanting or inclination of the valve element 16 can be prevented and thus, when flow passage of fluid is closed, the valve element 16 and the valve seat 68 are tightly contacted with each other in a parallel manner and the flow passage is closed securely.

The valve seat 68 is a cylindrical member made of stainless steel. The valve seat 68 is formed with a shaft hole into which the main body part 64 of the slider 60 is inserted, and a spring accommodating hole 681 which is formed larger than the shaft hole and is capable of accommodating a spring 70 which is provided around the main body part 64 of the slider 60. The valve seat 68 is formed of a small diameter part and a large diameter part. Its small diameter part is press-fitted to each of the inflow ports 24 which are formed in the base plate 22 and, as a result, the valve seat 68 is fixed to the base plate 22. In addition, the inflow pipe 12 is fitted and fixed to the large diameter part of the valve seat 68.

An assembling method for the valve element opening/closing device 1 which is structured as described above will be described below with reference to FIGS. 6 and 7 and FIG. 1.

First, the valve seats 68 are press-fitted and fixed to the inflow ports 24 of the base plate 22, and then the inflow pipes 12 and the outflow pipe 14 are fixed by brazing (see FIG. 6). In this case, any brazing material may be used but nickel brazing is the most preferable.

Next, the transmitting gear 56 and the slider 60 are fitted to the shaft 53 of the plate 52. Specifically, the base part 62 of the slider 60 is fitted into the engaging hole 58 of the transmitting gear 56, and the transmitting gear 56 and the slider 60 are fitted to the shaft 53 in a state that a recessed cam face 59 of the transmitting gear 56 and a protruded cam face 63 of the slider 60 are abutted with each other. In this case, the recessed engaging part 531 formed in the shaft 53 and the protruded engaging part 671 formed in the shaft hole 67 of the slider 60 are engaged with each other. Further, the transmitting gear 56a for fluid "A" and the transmitting gear 56b for fluid "B" are assembled so that the gears are set in the predetermined positional relationship in the turning directions by utilizing the recessed parts 562 as described above. After that, the spring 70 is fitted around the main body part 64 of the slider 60.

In this state, the positioning pin 23 stood on the base plate 22 is engaged with the positioning boss 54 of the plate 52 and the plate 52 is mounted on the base plate 22. In this manner, the transmitting gear 56 and the slider 60 are supported between the base plate 22 and the plate 62. Further, the spring 70 is held between the valve seat 68 and the slider 60. After that, the valve element 16 is dropped from a tip end side of the inflow pipe 12 (see FIG. 7) and then fixed to the end part 66 of the slider 60 (see FIG. 8).

Finally, the main body case 20 in which the rotor 32 is accommodated and the base plate 22 are fixed by TIG welding and then, the stator part 40 and a mounting plate 99 for fixing the valve element opening/closing device 1 to a refrigerator or the like are attached and assembling of the valve element opening/closing device 1 is completed (see FIG. 1).

Next, an opening/closing operation of the valve element 16 in the valve element opening/closing device 1 will be described below with reference to a time chart shown in FIG. 9. In this time chart, "INA" indicates an opening/closing state of the valve element 16a and "INB" indicates an opening/closing state of the valve element 16b. Further, under the time chart, opening/closing states of the valve element 16a and the valve element 16b are schematically shown. In the following description, the notational symbol "a" is added to the structural components for controlling the fluid "A" and the notational symbol "b" is added to the structural components for controlling the fluid "B".

In the initial state (home position) in this time chart, the valve elements 16a and 16b are pressed against the valve seats 68a and 68b by fluid pressures to be inputted and both the openings 65a and 65b (inflow ports 24a and 24b) are in closed states: the mode (1. close-close).

In this state, when the motor 30 is driven and the rotor 32 is rotated, the transmitting gears 56a and 56b are turned by the rotor 32. In this case, a turning direction of the transmitting gear 56a is opposite to a turning direction of the transmitting gear 56b. When the rotor 32 is rotated by a predetermined amount, the slider 60a whose movement in the turning direction is restricted by the above-mentioned turning prevention mechanism is pushed up by the recessed cam face 59a of the transmitting gear 56a and thus the valve element 16a is moved to be in an open state. On the other hand, the valve element 16b is still remained in a closed state: the mode (2. open-close). In this case, the spring 70a interposed between the slider 60a and the valve seat 68a is contracted because the slider 60a is pushed up and thus the valve element 16a is urged to the closing direction.

Next, when the rotor 32 is further rotated by a predetermined amount, the slider 60b is pushed up by the recessed cam face 59b of the transmitting gear 56b and the valve element 16b is moved to be in an open state. On the other hand, the valve element 16a is still remained in the open state: the mode (3. open-open). In this case, similarly to the valve element 16a, the spring 70b is contracted and the valve element 16b is urged to the closing direction.

Next, when the rotor 32 is further rotated by a predetermined amount, the pushing-up state of the slider 60a by the recessed cam face 59a of the transmitting gear 56a is released. As a result, the valve element 16a is returned to the closed state by the urging force of the spring 70. In addition, in this case, the valve element 16a receives an urging force to the closing direction due to a pressure of the fluid flowing into the fluid cavity 5 in addition to an urging force of the spring 70a to be pressed to the valve seat 68. Therefore, flow of the fluid can be securely closed: the mode (4. close-open).

As described above, the valve element opening/closing device 1 in accordance with the first embodiment of the present invention is provided with four different modes as an opening/closing state of the valve elements 16a and 16b, which are controlled to be a desired mode by appropriately changing a forward/reverse rotation of the motor 30. In this embodiment, the modes where either one of the valve elements 16a and 16b is opened, i.e., the mode (2. open-close) and the mode (4. close-open) are appropriately changed, either of two kinds of fluid to be inputted can be selectively passed.

In the description of the opening/closing operation of the valve element 16, the initial state (home position) is set to be the mode (1. close-close) but the present invention is not limited to this embodiment. For example, the opening/closing operation may be controlled such that the above-mentioned four different modes are appropriately changed by changing a rotation amount of the rotor 32.

Further, in the embodiment described above, it is structured that the mode (3. open-open) where the valve elements 16a and 16b are positioned in the open state is selectable. This mode is preferably used when the base plate 22 is heated to a high temperature by welding (brazing) at the time of that the inflow pipes 12 and the outflow pipe 14 of the valve element opening/closing device 1 are connected with the base plate 22 having fluid flow passages. In this case, both the valve elements 16a and 16b are separated apart from the base plate 22 and thus damage of the valve elements 16a and 16b due to welding heat can be prevented. Further, this mode is used in a case where two kinds of fluid to be inputted are mixed and passed according to modes required to the valve element opening/closing device 1.

Next, a valve element opening/closing device in accordance with a second embodiment of the present invention will be described below. The valve element opening/closing device in this embodiment is a so-called "3-IN/1-OUT" valve in which three kinds of fluids (three kinds of fluid at different temperatures) inflowing (inputting) to the device is selectively outputted or passed as one kind of fluid. The valve element opening/closing device in the second embodiment is different from the valve element opening/closing device 1 in the first embodiment only at the point that, since the number of fluid to be inputted is increased, a corresponding flow passage (inflow pipe 12) and structural components of the linearly moving mechanism part 50 such as the transmitting gear 56 and the slider 60 are increased. Therefore, structural components newly added in the valve element opening/closing device in accordance with the second embodiment are indicated by adding the notational symbol "c" and their detailed structure and assembling method are omitted.

Opening/closing operations of the valve elements 16 in this valve element opening/closing device will be described below with reference to a time chart shown in FIG. 10. In this time chart, "INA" indicates an opening/closing state of the valve element 16a, "INB" indicates that of the valve element 16b, and "INC" indicates that of the valve element 16c.

First, in the initial state (home position), the valve elements 16a through 16c are pressed against the valve seats 68a through 68c by pressures of fluids to be inputted. Therefore, all openings 65a through 65c (inflow ports 24a through 24c) are in a closed state: the mode (1. close-close-close).

When the rotor 32 is rotated by driving the motor 30 from this state, the transmitting gear 56a through 56c are turned by the rotor 32. When the rotor 32 is rotated by a predetermined amount, the slider 60a whose movement in a rotating direction is restricted by the above-mentioned turning prevention mechanism is pushed up by the recessed cam face 59a of the transmitting gear 56a and thus the valve element 16a is moved to be in an open state. On the other hand, the valve elements 16b and 16c are still maintained in the closed state: the mode (2. open-close-close). When the slider 60a is pushed up, the spring 70a disposed between the slider 60a and the valve seat 68a is contracted by the slider 60a and thus the valve element 16a is urged in the closing direction.

When the rotor 32 is further rotated by a predetermined amount from this state, the slider 60b is pushed up by the recessed cam face 59b of the transmitting gear 56b and the valve element 16b is moved to be in an open state. On the other hand, the open state of the valve element 16a and the closed state of the valve element 16c are maintained: the mode (3. open-open-close). When the slider 60b is pushed up, similarly to the case of the valve element 16a, the spring 70b is contracted and the valve element 16b is urged in the closing direction.

Next, when the rotor 32 is further rotated by a predetermined amount, pushing-up of the slider 60a by the recessed cam face 59a of the transmitting gear 56a is released. Therefore, the valve element 16a is returned to the closed state by the urging force of the spring 70a. Further, in this case, in addition to the urging force of the spring 70a, the valve element 16a receives an urging force due to pressure of the fluid flowing into the fluid cavity 5 in the closing direction and pressed against the valve seat 68. As a result, flowing of the fluid is shut off surely: the mode (4. close-open-close).

When the rotor 32 is further successively rotated by a predetermined amount from this mode, the valve element 16c is moved to be in an open state: the mode (5. close-open-open) and next, the valve element 16b is moved by the urging force of the spring 70b and the pressure of fluid to be in the closed state: the mode (6. close-close-open) and next, the valve element 16a is moved to be in the open state: the mode (7. open-close-open) and finally, the valve element 16b is moved to be in the open state and all of the valve elements 16a through 16c are located in the open state: the mode (8. open-open-open).

As described above, the valve element opening/closing device in accordance with the second embodiment provides eight modes as open/close states of the valve elements 16a through 16c. In these modes, when the modes where either one of the valve elements 16a through 16c is set to be in the open state are appropriately changed, in other words, when the mode (2. open-close-close), the mode (4. close-open-close) and the mode (6. close-close-open) are appropriately changed, either one of three fluids to be inputted is selectively passed.

According to this valve element opening/closing device, in three kinds of fluid to be inputted into the valve element opening/closing device, when the modes where two or more kinds of fluid are mixed and passed are appropriately changed, in other words, when the mode (3. open-open-close), the mode (5. close-open-open), the mode (7. open-close-open), and the mode (8. open-open-open) are appropriately changed, a temperature of fluid to be outputted can be adjusted.

Further, similarly to the valve element opening/closing device 1 in accordance with the first embodiment, damage of the valve elements 16a through 16c due to heat at the time of welding can be prevented by selecting the mode (8. open-open-open) where all of the valve elements 16a through 16c are located in the open state.

In the valve element opening/closing devices in accordance with the first and the second embodiments, a drive force of the motor 30 is transmitted to the transmitting gears 56 from the output gear 38. However, the present invention is not limited to this embodiment. In other words, another transmission mechanism where a pulley or a sprocket is used may be adopted without using the above-mentioned gear mechanism. Further, when a drive force for moving the valve element 16 in the open direction is insufficient, a reduction gear may be disposed between the output gear 38 and the transmitting gear 56 to increase an output torque.

As described above, in the valve element opening/closing device in accordance with the above-mentioned embodiments, the valve element 16 for opening and closing a flow passage for fluid is disposed on an outer side of the main body 10, in other words, the valve element 16 is disposed on the inflow pipe side of opening 65 (inflow port 65) through which fluid flows and thus the valve element 16 is urged in the closing direction by the pressure of fluid to be flown. Therefore, when the opening 65 (inflow port 65) is set to be in the close state, a force resisting the fluid is not required and thus the opening 65 (inflow port 65) can be shut off securely. Further, the valve element 16 is operated in its axial direction to close the opening 65 (inflow port 65) and to separate from the opening 65 (inflow port 65). Therefore, the valve element 16 can be accommodated within the inflow pipe 12 and thus the size of the valve element opening/closing device can be reduced.

Further, the valve element opening/closing device provides the mode where all of flow passages for a plurality of inflow pipes 12 are in the closed state and the mode where only one flow passage of the inflow pipe 12 is set to be in the open state by using a plurality of the valve elements 16. Therefore, the valve element opening/closing device in accordance with the embodiments can be preferably applied to a case that fluid to be passed among plural kinds of fluid to be inputted is selectively controlled.

In addition, the valve element opening/closing device is provided with the mode where all of the flow passages for the plurality of the inflow pipes 12 are set to be in the open state. Therefore, when the valve element opening/closing device is to be assembled into a refrigerator or the like, the valve elements 16 can be prevented from being damaged by welding heat by means of that the valve elements 16 are separated from the openings.

Further, the valve element 16 is always urged in a direction where the opening 65 is set to be in the closed state by the spring 70 and thus a drive force of the motor 30 is used through the linearly moving mechanism part 50 only when the valve element 16 is moved in the direction that the opening 65 is to be opened. Therefore, electric power consumption of the valve element opening/closing device can be restrained.

In addition, in the linearly moving mechanism part 50, the turning prevention mechanism for the slider 60 (valve element 16) is structured by means of that the protruded engaging part 671 of the slider 60 to which the valve element 16 is fitted and the recessed engaging part 531 formed in the shaft 53 by which the transmitting gear 56 is rotatably supported are engaged with each other. Further, the turning restriction part 561 is formed in the transmitting gear 56 for restricting the turning amount to less than one rotation. Therefore, another separate member for preventing from turning of the valve element 16 or preventing from further rotation of the transmitting gear 56 is not required and thus the structure of the valve element opening/closing device can be made compact.

Although the present invention has been shown and described with reference to specific embodiments, various changes and modifications will be apparent to those skilled in the art from the teachings herein.

For example, the valve element opening/closing device in accordance with the embodiment may be preferably applied to a case that the valve element opening/closing device is mounted and fixed to the inside of a refrigerator, etc., through the mounting plate 99 to control opening/closing a flow passage for a refrigerant such as isobutane or chlorofluorocarbon CFC. In addition, the present invention may be applied to an opening/closing valve for controlling opening/closing other liquid or gas.

Further, the drive source in the above-mentioned embodiment is the motor 30, i.e., the stepping motor but a solenoid, a cylinder, etc. may be used as the drive source. In addition, in the embodiment described above, a rotary power is converted into a linear power by using the cam mechanism having the recessed cam face 59 and the protruded cam face 63. However, the present invention is not limited to the above-mentioned structure. Any power transmission mechanism by which a rotational movement can be converted into a linear movement may be utilized. For example, a structure may be applicable in which a valve element is advanced and retreated to and from the opening 65 by rotating a screw member to which the valve element is mounted.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A valve element opening/closing device comprising:
    a main body which is formed with a space in an inside of the main body;
    an inflow pipe which is connected to the main body for flowing fluid into the space;
    an outflow pipe which is connected to the main body for flowing the fluid out from the space;
    a valve element for opening and closing a flow passage through which the fluid flows from the inflow pipe to the outflow pipe through the main body; and
    a drive part for driving the valve element to open and close the flow passage;
    wherein the valve element, which is moved by the drive part to be in an open state or in a close state, is arranged on an inflow pipe side with respect an opening of the main body to which the inflow pipe is connected;
        wherein the drive part comprises:
            a motor which is a drive source; and
            a linearly moving mechanism part which drives the valve element so as to be abutted with or separated from the opening by rotation of the motor; and
        the linearly moving mechanism part comprises:
            a linearly moving member which is connected with the valve element;
            a cam which is turned by the motor for moving the valve element in a separating direction from the opening through the linearly moving member; and
        an urging member for urging the valve element in a closing direction of the valve element;
    wherein the valve element opening/closing device further comprises:
        a base plate which structures the main body and which is formed with an opening connected with the inflow pipe; and
        a valve seat which is fixed on the inflow pipe side of the opening formed in the base plate and, with which the valve element is tightly contacted to close the flow passage;
    wherein the valve element is disposed on the inflow pipe side of the valve seat and within the inflow pipe;
    wherein the linearly moving mechanism part comprises:
        a transmitting gear which is turned by the motor; and
        a slider for moving the valve element in an open direction by a gear side cam face as the cam which is formed on a valve element side of the transmitting gear;
            wherein the transmitting gear is disposed on a main body side with respect to the valve seat; and the valve element is mounted on the slider which is penetrated through the valve seat; and
        wherein the transmitting gear, the slider, the valve seat and the valve element are coaxially disposed.

2. The valve element opening/closing device according to claim 1, wherein the inflow pipe comprises a plurality of inflow pipes and the valve element is arranged in each of the inflow pipes.

3. The valve element opening/closing device according to claim 2, further comprising:
    a mode in which all of flow passages for the plurality of the inflow pipes are set to be in a closed state by using each of the plurality of the valve elements; and
    a mode in which only one of the flow passages is set to be in an open state.

4. The valve element opening/closing device according to claim 3, further comprising a mode in which all of the flow passages are set to be in an open state by using the plurality of the valve elements.

5. The valve element opening/closing device according to claim 1, further comprising
    a turning prevention mechanism which is provided in the linearly moving mechanism part for restricting turning of the valve element;
    a shaft by which the transmitting gear is turnably supported;
    wherein the turning prevention mechanism comprises:
        a protruded part which is provided in the slider; and
        a recessed part which is formed in the shaft and engaged with the protruded part which is provided in the slider.

6. The valve element opening/closing device according to claim 5, further comprising a turning restriction part which is provided in the transmitting gear for restricting a turning amount of the transmitting gear to less than one rotation.

7. The valve element opening/closing device according to claim 6, wherein the inflow pipe comprises a plurality of inflow pipes and the valve element is arranged within each of the inflow pipes.

* * * * *